July 29, 1969  S. T. PATYNA ET AL  3,457,573
HOLLOW BOLT AND METHOD OF MAKING SAME
Filed April 25, 1967  2 Sheets-Sheet 1
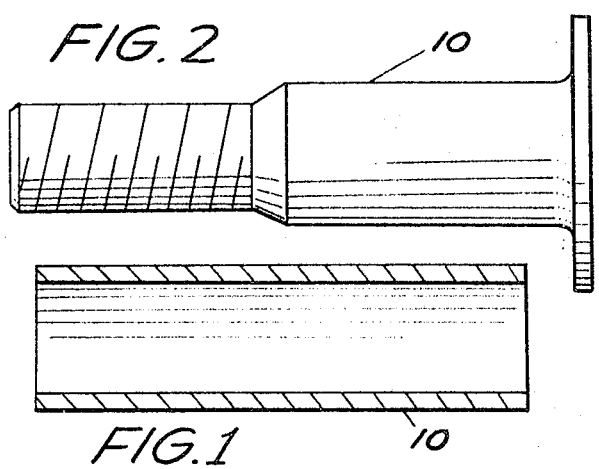
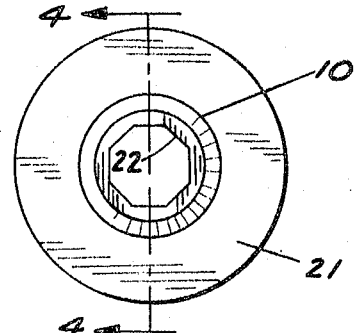
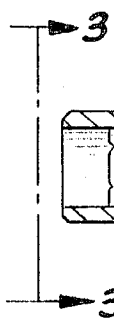
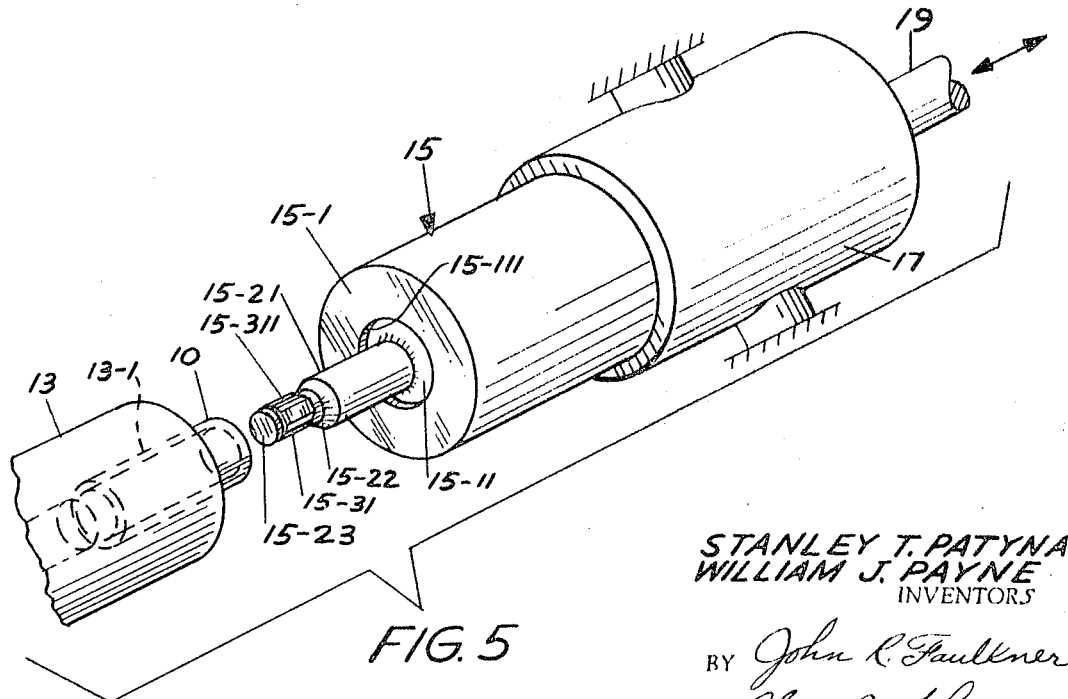
STANLEY T. PATYNA
WILLIAM J. PAYNE
INVENTORS
BY John R. Faulkner
Olin B. Johnson
ATTORNEYS

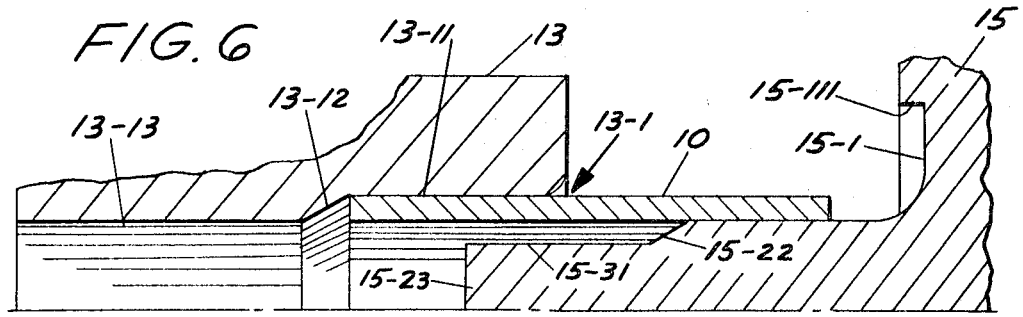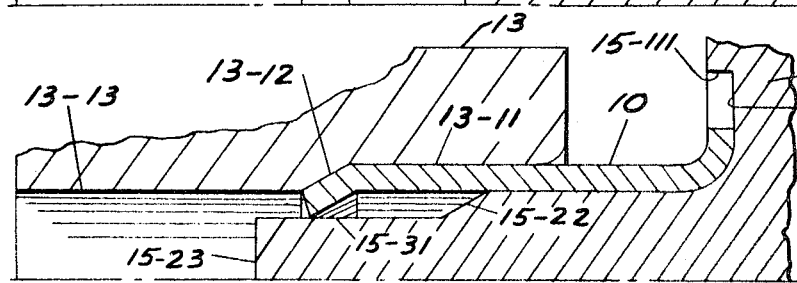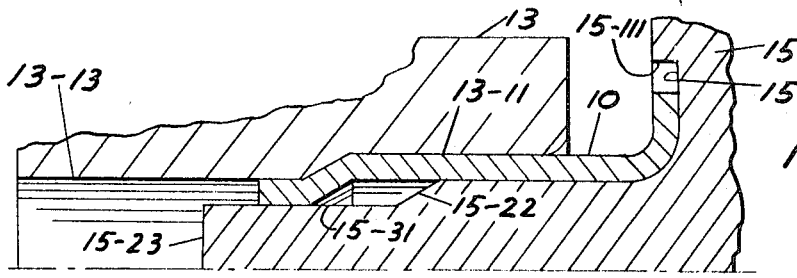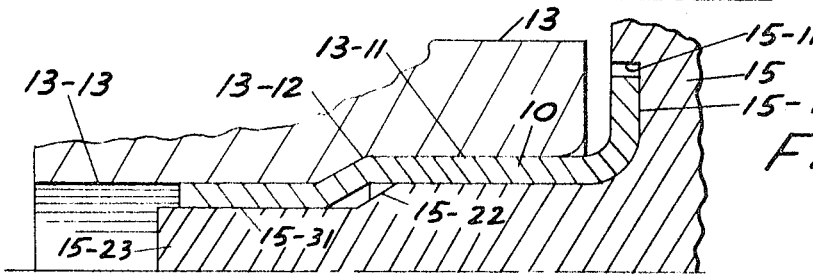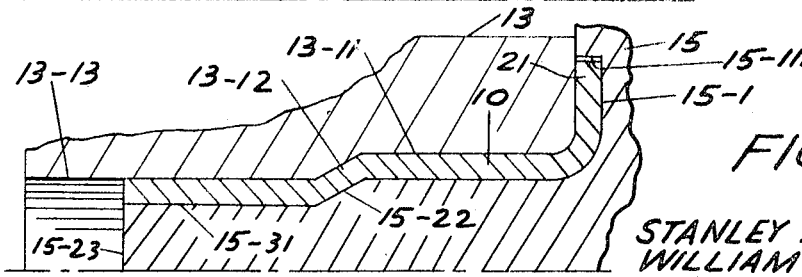

United States Patent Office 3,457,573
Patented July 29, 1969

3,457,573
HOLLOW BOLT AND METHOD OF MAKING SAME
Stanley T. Patyna and William J. Payne, Livonia, Mich., assignors to Ford Motor Company, Dearborn, Mich., a corporation of Delaware
Filed Apr. 25, 1967, Ser. No. 633,493
Int. Cl. B21k 1/44; F16b 35/00
U.S. Cl. 10—27                               6 Claims

ABSTRACT OF THE DISCLOSURE

A method for manufacturing a hollow bolt having a low profile head and adapted for internal wrenching from either end by die forming a metal tube and subsequently threading a portion thereof, and a bolt of the form produced by this method.

---

This invention is concerned with a novel bolt and a method for its manufacture. In particular, this invention is concerned with the manufacture of a hollow bolt that is externally threaded and bears upon its internal surface a wrench receiving surface which can be reached from either end of the bolt and, in cooperation with a suitable wrench, utilized to hold or turn the bolt when a tap is affixed thereto or the bolt is otherwise seated in a threaded aperture.

The bolts of this invention are formed from a seamless tube stock which may be any readily cold-workable metal or alloy having sufficient structural strength and hardness for the intended use of the bolt. The bolts of this invention are characterized by a low profile head and an internal wrenching surface which can be reached from either end of the bolt. They are thus particularly useful in those applications wherein a bolt having a head of wrenchable thickness does not satisfy clearance requirements and in applications where installation is difficult or impossible with a bolt that requires head wrenching.

A hollow bolt having suitable wall thickness and standard thread size can provide the same polar moment of inertia as a solid bolt of the same composition and of essentially equal outside diameter while weighing only about one-half as much. For example, a $\frac{7}{16}$ inch outside diameter solid bolt having a Jp of .0038 in.$^4$ can be replaced with a hollow bolt of $\frac{1}{2}$ inch outside diameter and .060 inch wall thickness having a Jp of .0041 in.$^4$.

This invention will be more fully understood from the following detailed description read in connection with the accompanying drawings, wherein:

FIGURE 1 is a sectional view of a tubular bolt blank from which the bolt of FIGURE 2 is formed;

FIGURE 2 is a view in side elevation of one embodiment of a bolt of this invention;

FIGURE 3 is an end view of the bolt of FIGURE 2 taken along line 3—3;

FIGURE 4 is a sectional view of the bolt of FIGURE 2 taken along line 4—4;

FIGURE 5 is a partial assembly view of bolt making apparatus suitable for use in forming the bolts of this invention; and FIGURES 6 to 10 inclusive are partial sectional views of a male die, a female die and a tubular bolt blank illustrating sequentially the movement of a male die into the bolt blank seated in the female die and the consequential sequential forming of a bolt in accordance with the method of this invention.

In the illustrated embodiment of the method of this invention, the tubular bolt blank 10 of FIGURE 1 is shown seated in the forming cavity 11 of a female die 13, shown in FIGURES 5 to 10. Positioned to the right of female die 13 in FIGURE 5 is a male die 15 supported by die support 17 and is operatively connected with a power source not shown via shaft 19 through which reciprocating movement is imparted to die 15. Female die 13 and male die 15 are detachable dies mounted on a conventional bolt making machine. Female die 13 is held in stationary position by die support means not shown. One directional movement of male die 15 is illustrated in FIGURES 6 to 10, such movement being followed by withdrawal in the opposite direction to a position such as that shown in FIGURE 5.

In the illustrated embodiment, blank 10 is a section of a seamless tubing formed from a medium carbon steel, i.e., S.A.E. 1030.

In the illustrated embodiment, male die 15 comprises a base 15–1. In the face of base 15–1 is an annular recess 15–11 having a circumferential wall 15–111 which encompasses the base of an axially aligned punch 15–2. Punch 15–2 has a longitudinally-extending, essentially cylindrical, section of major diameter 15–21 which abuts base 15–1, a tapered section 15–22, and a longitudinally-extending section of minor diameter 15–23. Intermediate the ends of section 15–22 is a longitudinally-extending, section of minor diameter 15–23. Intermediate the ends of section 15–22 is a longitudinally-extending, multi-sided section 15–31. The external surface of section 15–31 comprises a plurality of longitudinally-extending, essentially planar, and abutting surfaces 15–311. The width and number of these surfaces will correspond to the width and number of corresponding faces upon the holding head of the wrenching tool to be used in holding or turning the completed bolt.

In the illustrated embodiment, forming cavity 13–1 of female die 13 includes a cylindrical channel 13–11 of major diameter extending backward from the orifice through which the tubular blank 10 is inserted, a tapered channel 13–12 immediately adjacent to and communicating with channel 13–11, and a channel of lesser diameter 13—13 adjacent to and communicating with channel 13–12. The outside diameter of blank 10 and the diameter of channel 13–11 differ only enough to provide sufficient clearance for rapid insertion of the blank.

When blank 10 is inserted into the forming cavity 13–1, it comes to rest at the end of channel 13–11 with a portion thereof extending outside the forming cavity. Male die 15 is inserted into the opening at the exposed end of tubular bolt blank 10 and thrust forward inside such blank. When the male die 15 moves forward the exposed end of blank 10 comes into contact with the curved surface at the base of punch 15–2 and is turned outward along the bottom of the recess 15–11 until it eventually is stopped by wall 15–111 thereby forming the head 21 of the bolt being produced. At the same time, pressure is exerted against the exposed end of blank 10 and by frictional engagement with section 15–21 of male die 15. As male die 15 moves forward, the seated end of blank 10 is forced along the tapered surface of channel 13–12 and thence along the wall of channel 13—13. In this operation, the interaction of female die 13 and male die 15 upon the blank 10 is such that blank 10 is bent and extruded in such a manner that the body of the bolt being formed conforms externally to the surface configuration of forming cavity 13–1 and internally to a mirror image of the external surface of punch 15–2. Thus, compression of the blank upon the multi-sided section 15–31, upon movement of blank 10 and punch 15–2 into channel 13—13, forms upon the internal surface of the bolt a wrenching surface or socket 22. A portion of socket 22 is shown in FIGURE 4.

It will be understood by those skilled in the art that the positioning of the multi-sided section 15–22 on punch 15–2 may be located either on section 15–23 or the section of major diameter 15–21 or both to provide the desired wrenching surface.

After the bolt is formed, the male die 15 is withdrawn and the bolt is ejected from the forming cavity 13–1 by ejection means not shown, e.g. an ejection punch inserted from the end of channel 13—13 opposite the end into which the bolt is inserted. The ejected bolt is then externally threaded by conventional threading means. A horn die is advisedly inserted inside the threaded portion of the bolt during the threading operation.

In the illustrated embodiment, the outside diameter of the bolt blank employed corresponded to the maximum diameter of the body portion of the completed bolt and the threaded portion was extruded into a section of lesser diameter. In another embodiment of this invention, the outside diameter of the bolt blank corresponds to the lesser outside diameter of the bolt to be produced and the male and female dies have cooperatively shaped surfaces to effect upsetting of a portion of the blank to the major outside diameter of the body portion of the bolt.

The term "Jp" employed herein is a symbol used to designate "polar moment of inertia," i.e. the sum of the moments of inertia of an area about two rectangular axes in the plane of an area intersecting the polar axis. See, Tool Engineers Handbook, American Society of Tool Engineers, 1949, McGraw-Hill Book Co., New York, N.Y. at page 1819.

The abbreviation "S.A.E." employed herein refers to the Society of Automotive Engineers and in conjunction with the number refers to a classification of steel established by said Society.

It is to be understood that this invention is not limited to the examples herein shown and described but that changes and modifications may be made within the spirit and scope of the invention as defined in the appended claims.

We claim:

1. A method for forming a hollow bolt having a low profile head and adapted for internal wrenching from either end which comprises positioning a tubular bolt blank within a female die, said bolt blank having an internal surface describing a channel extending therethrough, the depth of the forming cavity of said female die and the length of said bolt blank being interrelated in a manner such that when said bolt blank is seated within said female die the lip comprising one end of said bolt blank protrudes from the forming cavity of said female die a distance at least sufficient for forming the head of said bolt therefrom, inserting a male die into said channel of said tubular bolt blank through the orifice formed by said lip, moving said male die through at least a substantial portion of the length of said channel, the external surfaces of said male die and the internal surfaces of said female die being constructed and arranged in a manner such that the movement of said male die through said portion of the length of said channel substantially changes the diameter of a longitudinally-extending portion of said bolt blank, deforms a portion of said internal surface so as to provide thereon a longitudinally-extending wrenching surface for use in seating the completed bolt within a threaded aperture, and forming a bolt head from said lip by rolling back said lip in the direction of the opposite end of said bolt blank, and threading a portion of the external surface of said bolt.

2. A method for forming a hollow bolt having a low profile head and adapted for internal wrenching from either end which comprises positioning a tubular bolt blank within a female die, said bolt blank having an internal surface describing a channel extending therethrough, the depth of the forming cavity of said female die and the length of said bolt blank being interrelated in a manner such that when said bolt blank is seated within said female die the lip comprising one end of said bolt blank protrudes from the forming cavity of said female die a distance at least sufficient for forming the head of said bolt therefrom, inserting a male die into said channel of said tubular bolt blank through the orifice formed by said lip, moving said male die through at least a substantial portion of the length of said channel, said male forming die having a longitudinally-extending portion of its external surface which describes a plurality of abutting, longitudinally-extending, essentially planar surfaces about the periphery thereof, moving said male forming die through at least a substantial portion of the length of said channel, the external surfaces of said male die and the internal surfaces of said female die being constructed and arranged in a manner such that movement of said male die through said portion of the length of said channel substantially changes the diameter of a longitudinally-extending portion of said bolt blank, deforms a portion of said internal surface so as to provide thereon a wrenching socket comprising a plurality of abutting, longitudinally-extending, essentially planar surfaces which are mirror images of the said planar surfaces of said male die, and forming a bolt head from said lip by rolling back said lip in the direction of the opposite end of said bolt blank, and threading a portion of the etxernal surface of said bolt.

3. A hollow bolt of unitary construction comprising an externally threaded, tubular body and a bolt head extending radially from one end of said tubular body, said tubular body bearing on an internal surface thereof a multi-faced wrenching socket accessible from either end thereof and spaced apart from said bolt head.

4. A hollow bolt in accordance with claim 3 wherein said head and the walls of said tubular body are of substantially equal thickness.

5. A hollow bolt of unitary construction comprising a tubular body and bolt head extending radially from one end thereof, said tubular body having at least a portion of its external surface threaded and bearing on its internal surface opposite the external threading a multi-faced wrenching socket accessible from either end thereof and spaced apart from said bolt head.

6. A hollow bolt of unitary construction comprising a tubular body and a bolt head extending radially from one end of said tubular body, said tubular body comprising a longitudinally-extending, cylindrical, externally threaded section of lesser diameter and a longitudinally-extending, cylindrical section of greater diameter abutting said head and interposed between said head and said threaded section, said threaded section bearing on its internal surface a multi-faced wrenching socket accessible from either end of said tubular body.

References Cited

UNITED STATES PATENTS

| | | | |
|---|---|---|---|
| 2,206,881 | 7/1940 | Crowley | 10—27 |
| 2,295,314 | 9/1942 | Whitney | 10—10 |
| 2,565,852 | 8/1951 | Ickes et al. | 10—2 |

FOREIGN PATENTS 140,849  4/1951  Australia.

CHARLES W. LANHAM, Primary Examiner

LOWELL A. LARSON, Assistant Examiner

U.S. Cl. X.R.

85—1